US011192085B2

(12) United States Patent
Lee et al.

(10) Patent No.: US 11,192,085 B2
(45) Date of Patent: Dec. 7, 2021

(54) BLOCK COPOLYMER, AND METHOD FOR PREPARING GRAPHENE USING SAME

(71) Applicants: LG Chem, Ltd., Seoul (KR); Seoul National University R&DB Foundation, Seoul (KR)

(72) Inventors: Mi Jin Lee, Daejeon (KR); Byeong-Hyeok Sohn, Daejeon (KR); Seung Yong Chae, Daejeon (KR); Won Jong Kwon, Daejeon (KR); Kwon Nam Sohn, Daejeon (KR)

(73) Assignees: LG Chem, Ltd.; Seoul National University R&DB Foundation

( * ) Notice: Subject to any disclaimer, the term of this patent is extended or adjusted under 35 U.S.C. 154(b) by 0 days.

(21) Appl. No.: 17/005,540

(22) Filed: Aug. 28, 2020

(65) Prior Publication Data

US 2020/0391171 A1    Dec. 17, 2020

Related U.S. Application Data

(63) Continuation of application No. 15/518,652, filed as application No. PCT/KR2015/013607 on Dec. 11, 2015, now Pat. No. 10,835,886.

(30) Foreign Application Priority Data

Dec. 12, 2014  (KR) .................. 10-2014-0179765
May 21, 2015   (KR) .................. 10-2015-0070988
Dec. 10, 2015  (KR) .................. 10-2015-0176206

(51) Int. Cl.
  *B01J 19/00*   (2006.01)
  *C01B 32/19*   (2017.01)
  (Continued)

(52) U.S. Cl.
  CPC .......... *B01J 19/0093* (2013.01); *C01B 32/19* (2017.08); *C08F 283/06* (2013.01);
  (Continued)

(58) Field of Classification Search
  CPC .......... B01J 19/0093; B01J 2219/0086; B01J 2219/00891; C08F 283/06; C08F 293/005;
  (Continued)

(56) References Cited

U.S. PATENT DOCUMENTS

2012/0104329 A1   5/2012   Meyer et al.
2013/0020278 A1   1/2013   Park et al.
(Continued)

FOREIGN PATENT DOCUMENTS

CN   102399353 A   4/2012
CN   102603961 A   7/2012
(Continued)

OTHER PUBLICATIONS

Database WPI Week 201827, Thomson Scientific, London, GB; AN 2018-251077 XP002781207.
(Continued)

*Primary Examiner* — Daniel C. McCracken
(74) *Attorney, Agent, or Firm* — Lerner, David, Littenberg, Krumholz & Mentlik, LLP

(57) ABSTRACT

The present invention relates to a method for preparing graphene using a novel block copolymer. The present invention has features that, by using the block copolymer to mediate graphene that is hydrophobic and a solvent of a feed solution that is hydrophilic, the exfoliation efficiency of graphene as well as the dispersion stability thereof can be increased during high-pressure homogenization.

16 Claims, 11 Drawing Sheets

(51) Int. Cl.
*C08F 283/06* (2006.01)
*C08F 293/00* (2006.01)

(52) U.S. Cl.
CPC ... *C08F 293/005* (2013.01); *B01J 2219/0086* (2013.01); *B01J 2219/00891* (2013.01); *C08F 2438/03* (2013.01)

(58) Field of Classification Search
CPC .. C08F 2438/03; C08F 212/08; C08F 293/00; C01P 2002/82; C01P 2004/03; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; C01B 32/19; C01B 32/184; C01B 32/182; C01B 32/198; C01B 2204/02; C01B 2204/04; C01B 2204/06; C01B 2204/065; C01B 2204/00; C01B 2204/20
See application file for complete search history.

(56) References Cited

U.S. PATENT DOCUMENTS

| | | |
|---|---|---|
| 2013/0078576 A1 | 3/2013 | Wu et al. |
| 2013/0123415 A1 | 5/2013 | Tanaka et al. |
| 2013/0209755 A1 | 8/2013 | Hustad et al. |
| 2014/0011094 A1 | 1/2014 | Park et al. |
| 2014/0225026 A1 | 8/2014 | Park et al. |
| 2014/0225067 A1 | 8/2014 | Kim et al. |
| 2014/0226429 A1 | 8/2014 | Notley |
| 2014/0248214 A1 | 9/2014 | Hersam et al. |
| 2015/0279504 A1 | 10/2015 | Viville et al. |
| 2015/0279506 A1 | 10/2015 | Wolfrum et al. |
| 2017/0166449 A1 | 6/2017 | Yoo et al. |

FOREIGN PATENT DOCUMENTS

| | | |
|---|---|---|
| CN | 103214634 A | 7/2013 |
| CN | 107827102 A | 3/2018 |
| EP | 2436722 A1 | 4/2012 |
| EP | 3056469 A1 | 8/2016 |
| JP | 2005320220 A | 11/2005 |
| JP | 2008151773 A | 7/2008 |
| JP | 2012520224 A | 9/2012 |
| JP | 2012236753 A | 12/2012 |
| JP | 2013075795 A | 4/2013 |
| JP | 2014084334 A | 5/2014 |
| JP | 2014514698 A | 6/2014 |
| JP | 2014231547 A | 12/2014 |
| KR | 20110139259 A | 12/2011 |
| KR | 101142525 B1 | 5/2012 |
| KR | 20130004638 A | 1/2013 |
| KR | 101241750 B1 | 3/2013 |
| KR | 101264316 B1 | 5/2013 |
| KR | 101274441 B1 | 6/2013 |
| KR | 20130091073 A | 8/2013 |
| KR | 20140102566 A | 8/2014 |
| KR | 20140144148 A | 12/2014 |
| WO | 2011155486 A1 | 12/2011 |
| WO | 2013154615 A1 | 10/2013 |
| WO | 2014038851 A1 | 3/2014 |
| WO | 2014053510 A1 | 4/2014 |
| WO | 2014076259 A1 | 5/2014 |

OTHER PUBLICATIONS

Extended European Search Report including written opinion for EP15867194.1 dated Jun. 4, 2018.
Hrsic, et al., "Amphiphilic block copolymers with pendant thiol groups in side chains by RAFT polymerization." Polymer, vol. 54, 2013, pp. 495-504.
International Search Report from PCT/KR2015/013607, dated Jun. 3, 2016.
Li, et al., "Synthesis and Micellar Morphology of PAA-b-PS Amphiphilic Block Copolymers", Journal of Functional Polymers, vol. 24, No. 3, Jul. 2011, pp. 231-237.
Liu, et al., "Preparation of graphene/polymer composites by direct exfoliation of graphite in functionalised black copolymer matrix." Carbon, vol. 51, 2013, pp. 148-155.
Partial Supplmentary Search Report for Application No. EP15867194.1 dated Apr. 24, 2018.
Poly(ethylene oxide), accessed on line at https://www.sigmaaldrich.com/catalog/substance/polyethyleneoxide1234525322683 11?lang=en&region=US on Jan. 30, 2020.
Polyacrylate, accessed online at https://www.britannica.com/science/polyacrylate on Jan. 23, 2020.
Polystyrene, accessed online at https://www.britannica.com/science/polystyrene on Jan. 23, 2020.
Risley, Mason J., "Surfactant-Assisted Solution Exfoliation and Processing of Graphite and Graphene." A Thesis Presented to The Academic Faculty, Georgia Institute of Technology, Aug. 2013, pp. 1-91.
Skaltsas, et al., "Graphene exfoliation in organic solvents and switching solubility in aqueous media with the aid of amphiphilic block copolymers." Journal of Materials Chemistric, vol. 22, 2012, pp. 21507-21512.
Suenaga et al., Preparation and Water-Dispersion Stability of Mono-Dispersed Polystyrene Particles Containing Poly(ethylene oxide) Chains, Nov. 2009, vol. 66, Issue 11, pp. 491-497 (Abstract Only).
Zheng et al., "Preparation of nano-sized poly(ethylene oxide) star microgels via reversible addition-fragmentation transfer polymerization in slective solvents," Polymer International, vol. 55, No. 9, Jun. 22, 2006, pp. 1114-1123.

[FIG. 1]
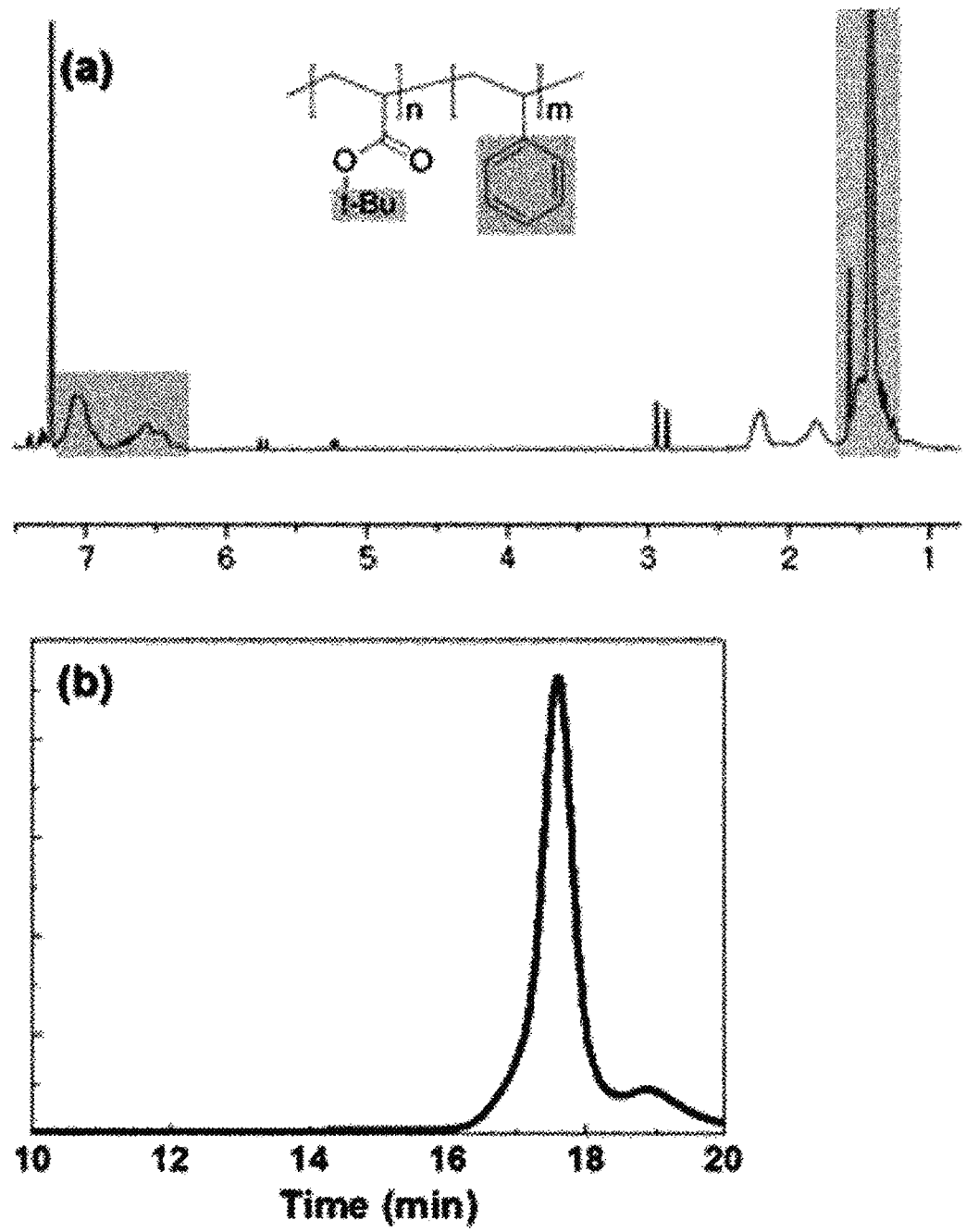

[FIG. 2]
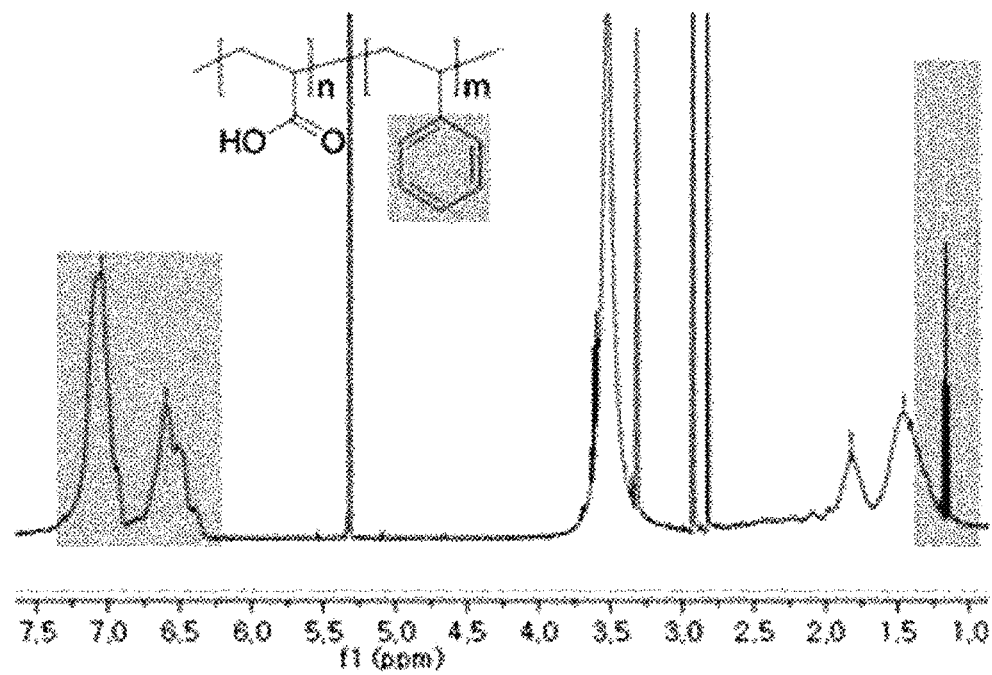
[FIG. 3]
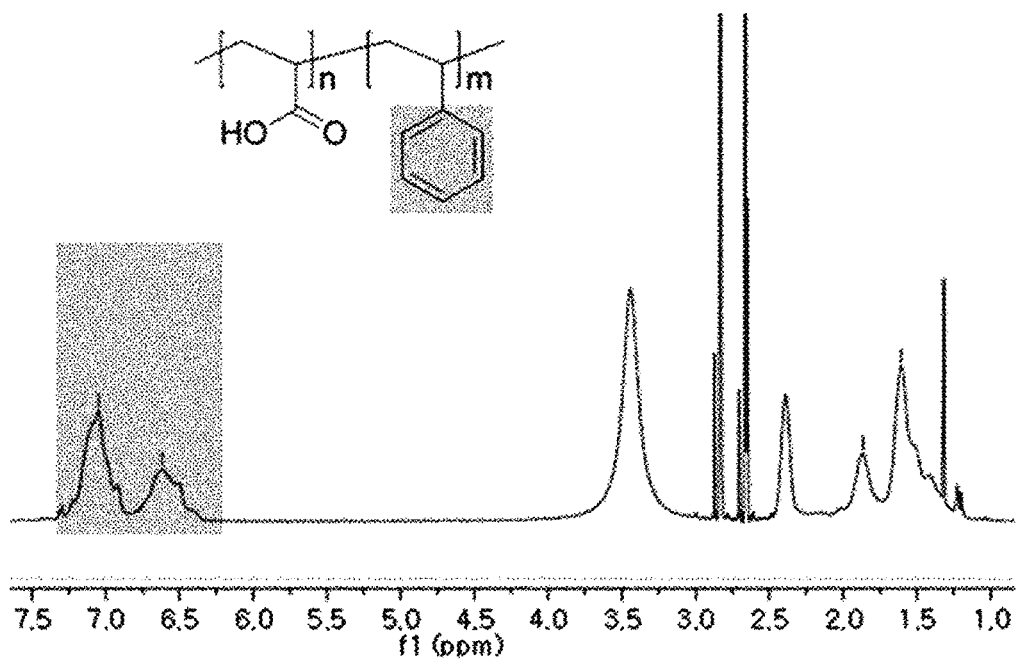

[FIG. 4]
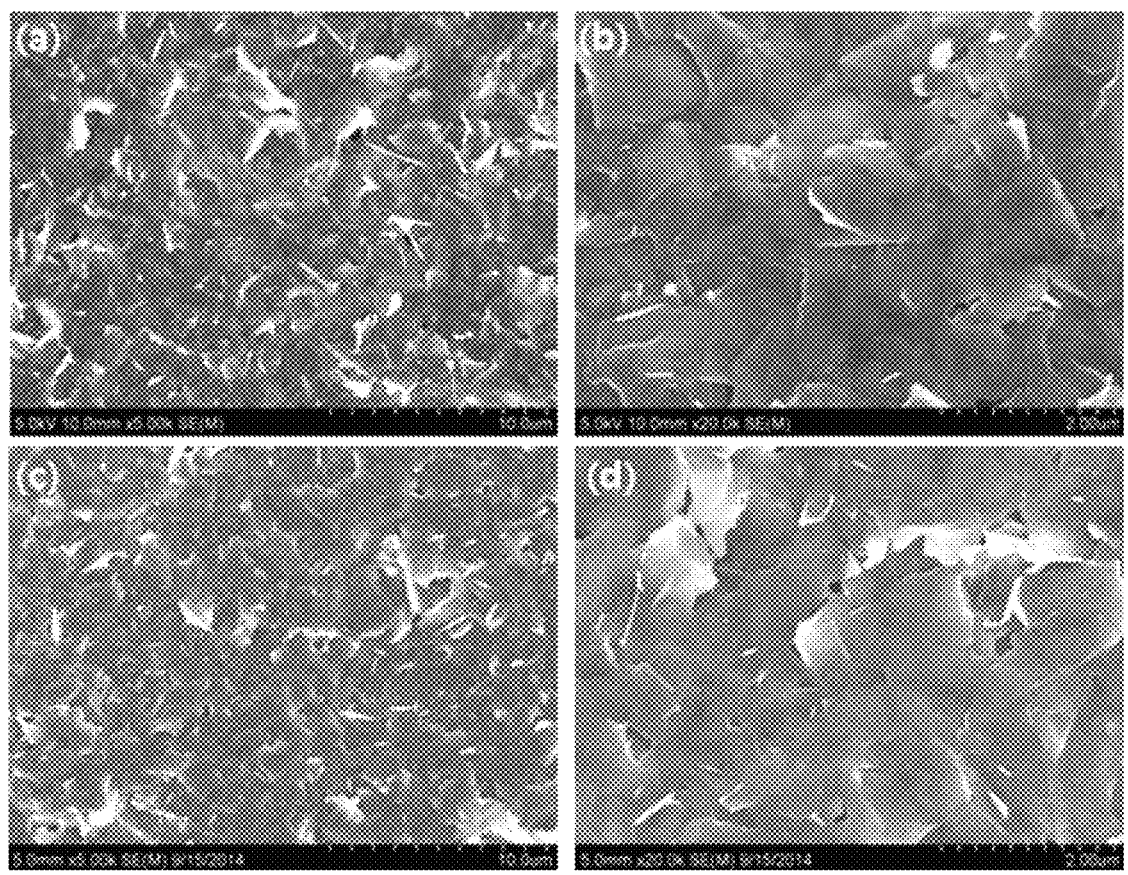

[FIG. 5]
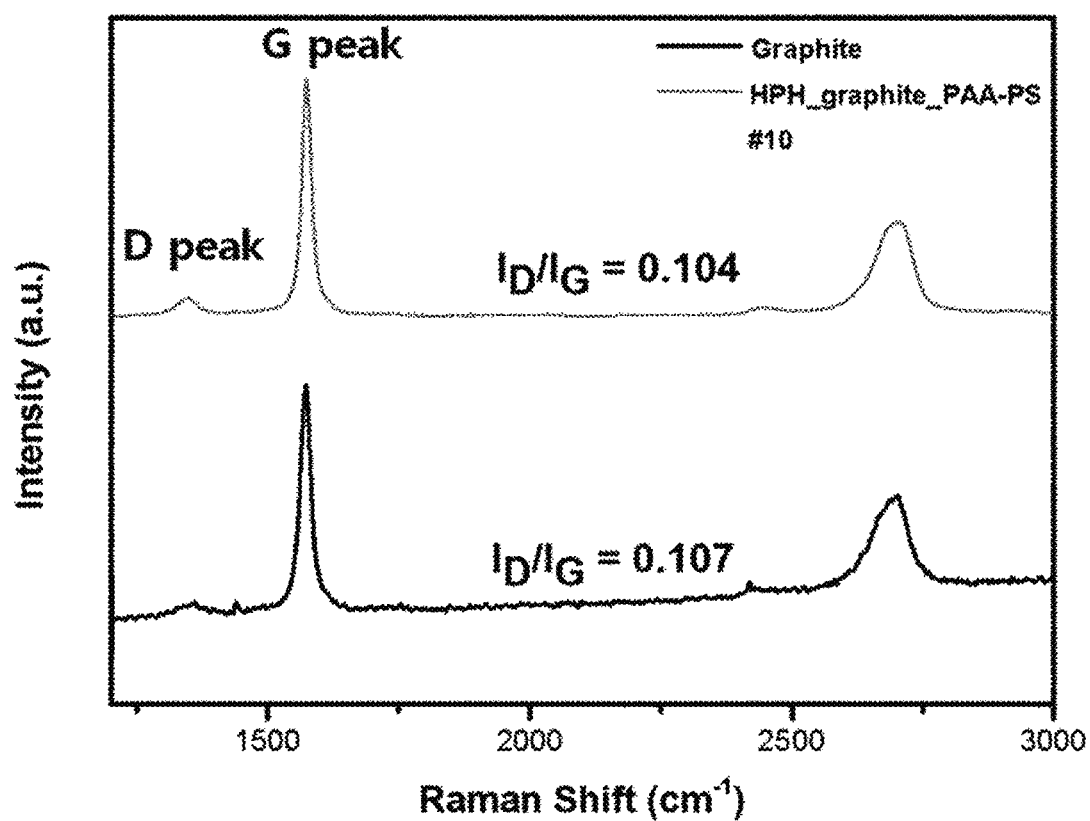

[FIG. 6]
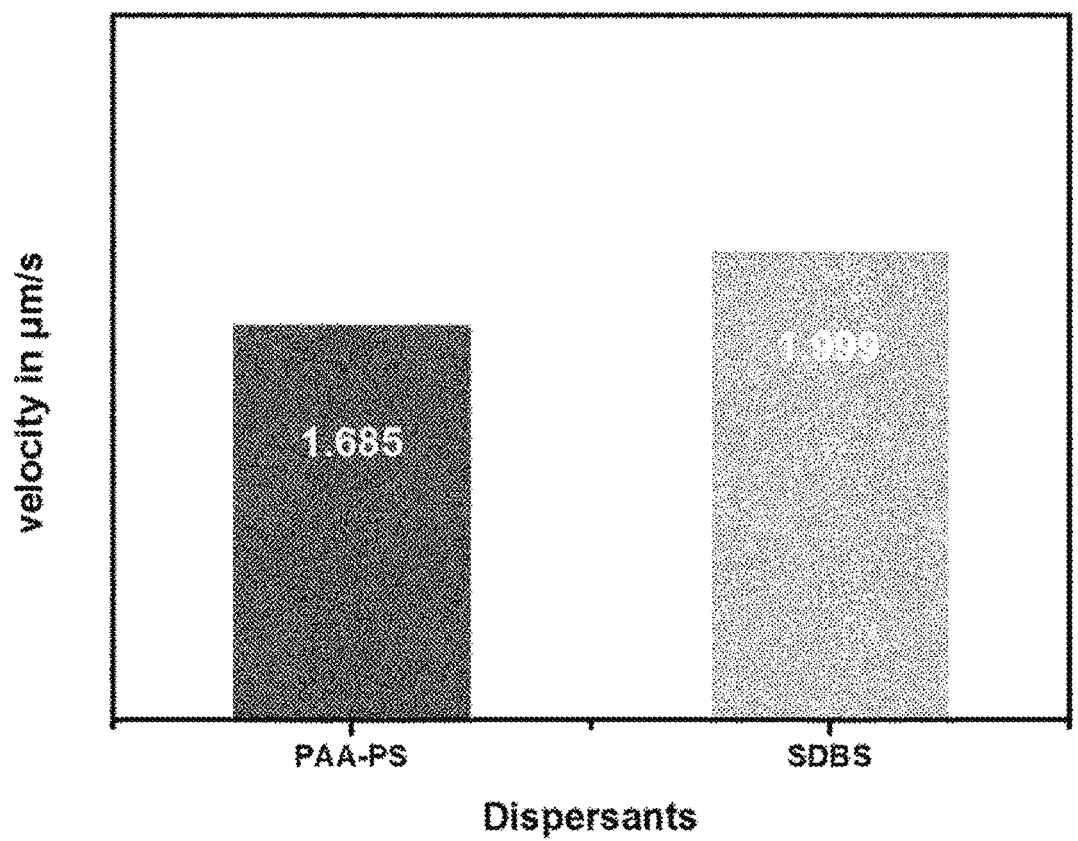

[FIG. 7]
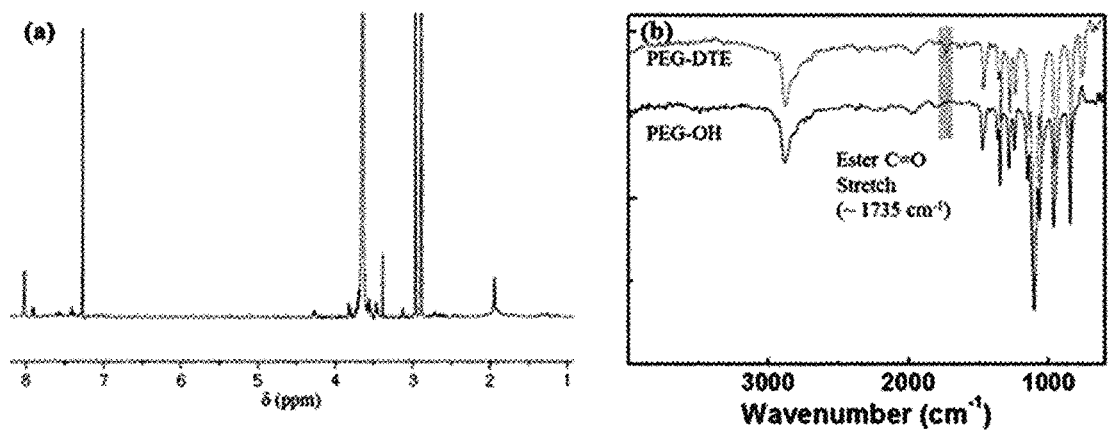
[FIG. 8]
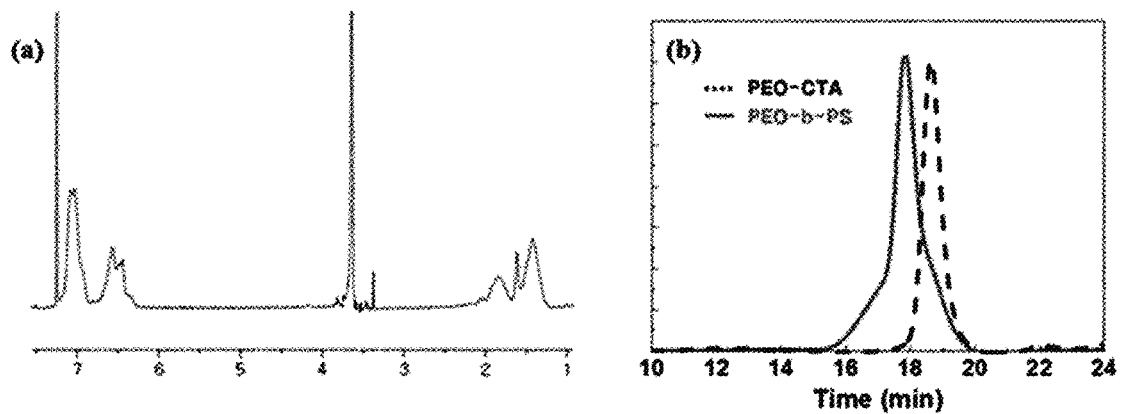

[FIG. 9]
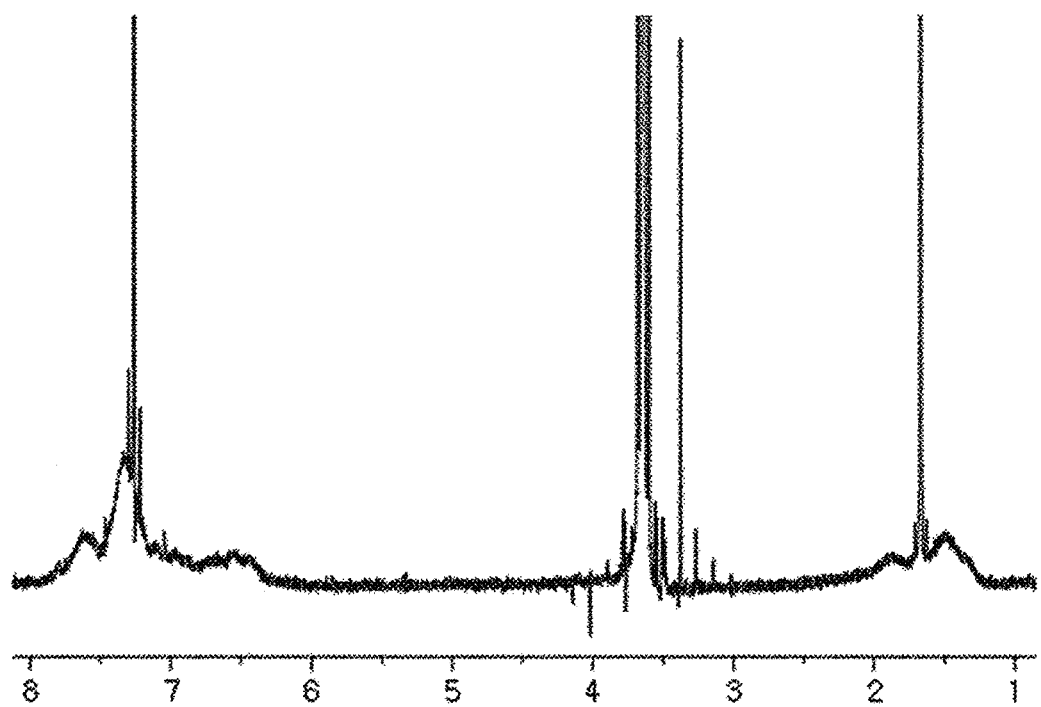

[FIG. 10]
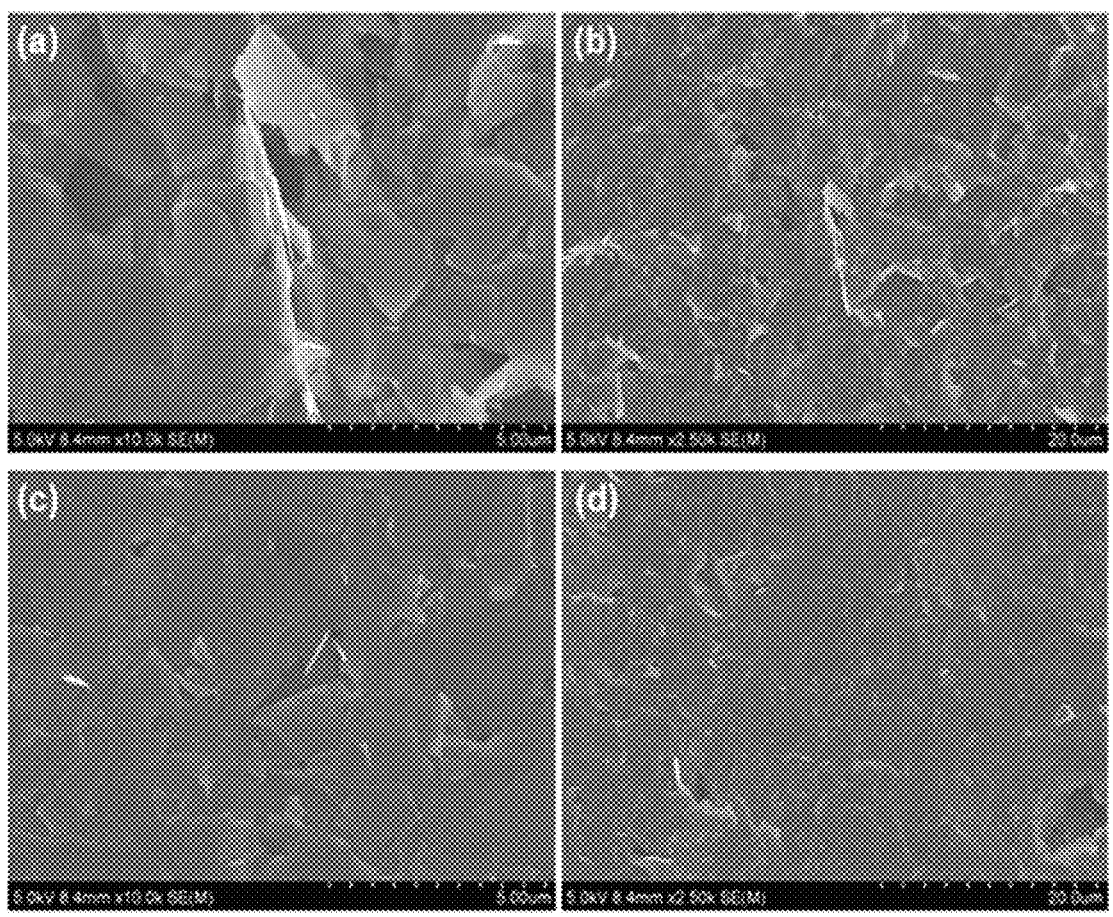

[FIG. 11]
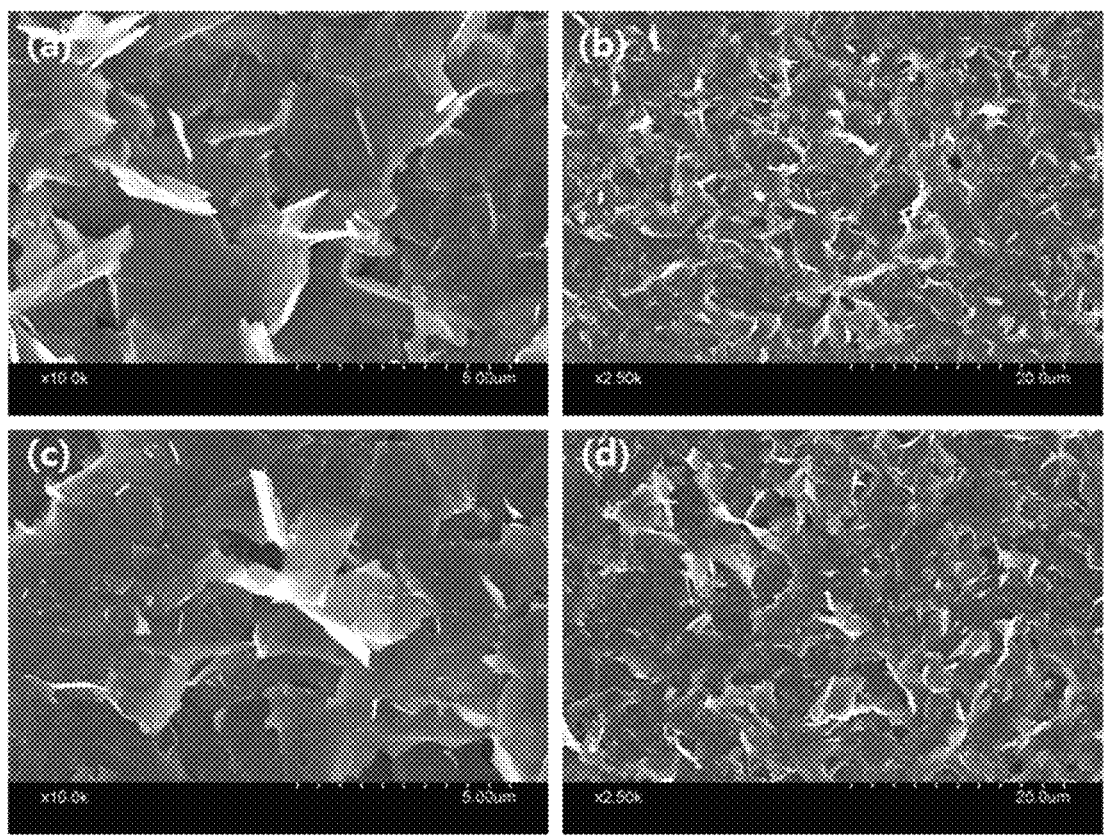

[FIG. 12]
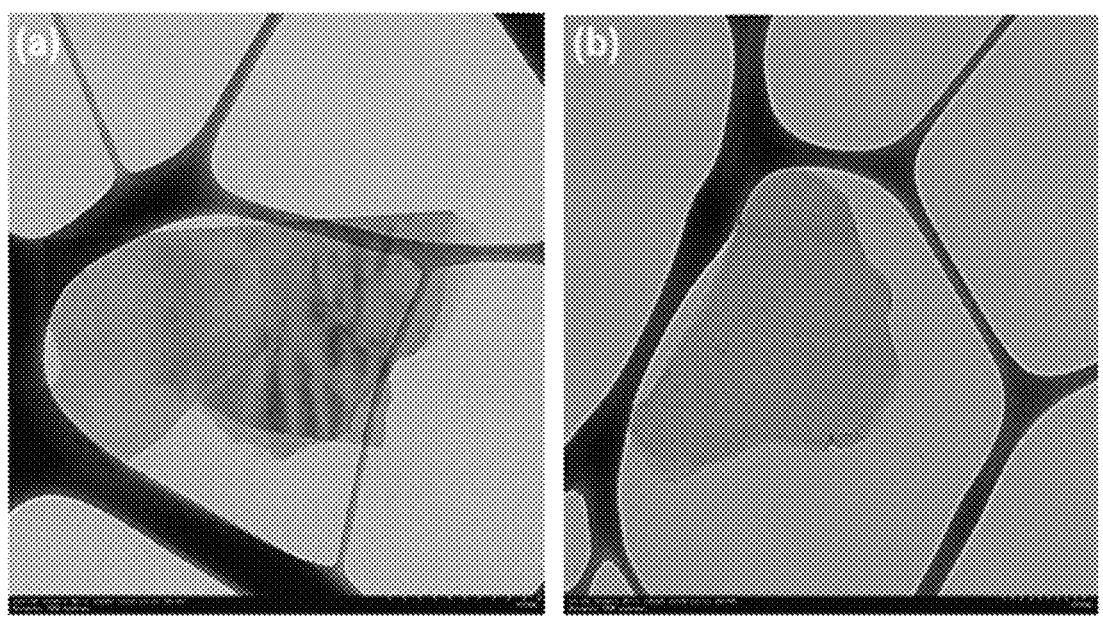
[FIG. 13]
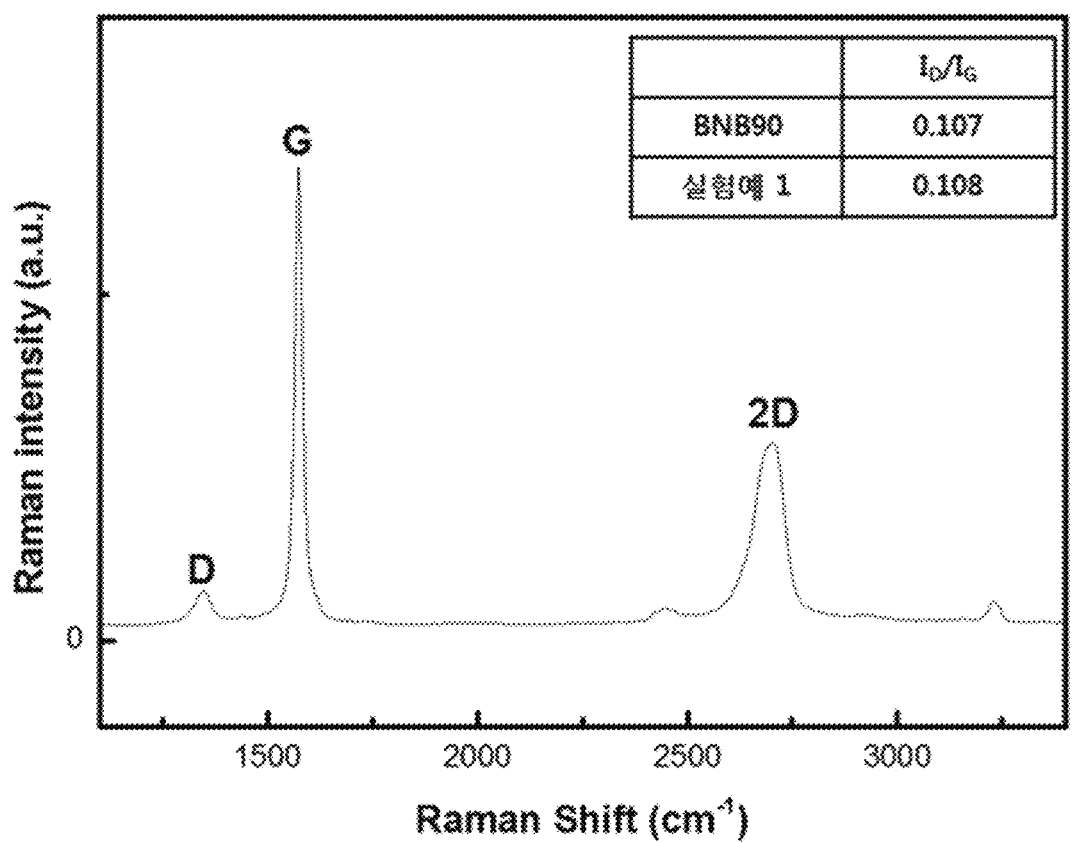

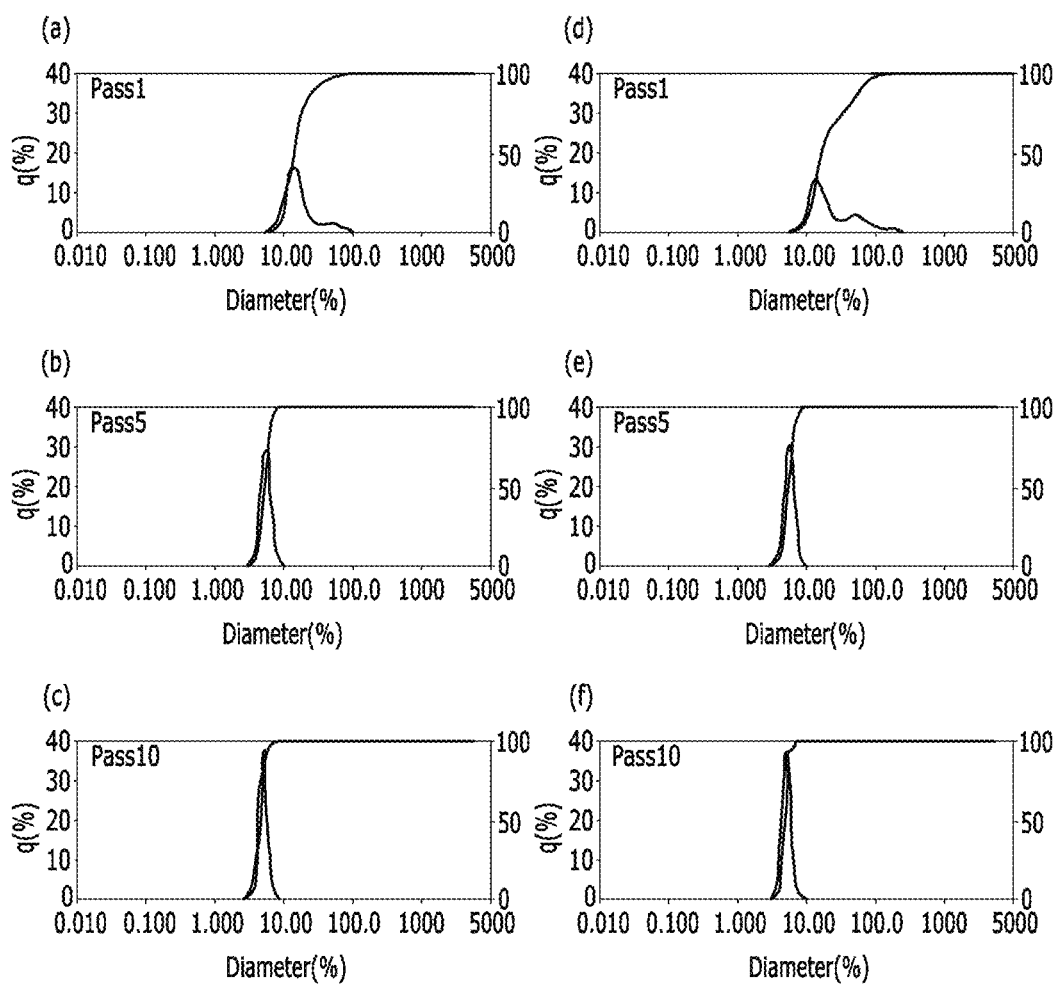
[FIG. 14]

BLOCK COPOLYMER, AND METHOD FOR PREPARING GRAPHENE USING SAME

CROSS-REFERENCE TO RELATED APPLICATION(S)

The present application is a continuation of U.S. patent application Ser. No. 15/518,652, filed on Apr. 12, 2017, which is a national phase entry under 35 U.S.C. § 371 of International Application No. PCT/KR2015/013607, filed Dec. 11, 2015, which claims priority from Korean Patent Application No. 10-2014-0179765 filed on Dec. 12, 2014, Korean Patent Application No. 10-2015-0070988 filed on May 21, 2015 and Korean Patent Application No. 10-2015-0176206 filed on Dec. 10, 2015, the disclosures of which are incorporated herein by reference.

TECHNICAL FIELD

The present invention relates to a novel block copolymer, and a method for preparing graphene using the same.

BACKGROUND OF ART

Graphene is a semimetallic material where carbon atoms form an arrangement connected in a hexagonal shape by two-dimensional sp2 bonding while having a thickness corresponding to a carbon atom layer. Recently, it has been reported that the properties of a graphene sheet having one carbon atomic layer were evaluated, and as a result, the graphene sheet may show very excellent electrical conductivity of electron mobility of about 50,000 cm$^2$/Vs or more.

Further, graphene has the properties of structural and chemical stability and excellent thermal conductivity. In addition, graphene is consisting of only carbon which is a relatively light element, and thus, easy to be processed in one-dimensional or two-dimensional nano-patterns.

Due to such electrical, structural, chemical and economical properties, graphene is expected to replace a silicon-based semiconductor technology and a transparent electrode in the future, and especially, is possible to be applied to a flexible electronic device field due to excellent mechanical properties.

Due to the numerous advantages and excellent properties of the graphene, various methods capable of more effective mass production of the graphene from carbon-based materials such as graphite, have been suggested or studied. In particular, a method capable of easily preparing a graphene sheet or flake with less defect generation, and having a smaller thickness and a large area has been studied in various ways, so that excellent properties of the graphene are more dramatically expressed. Such existing methods of preparing graphene include the following:

First, a method wherein a graphene sheet is exfoliated from graphite by a physical method such as using a tape, is known. However, such method is not suitable for mass production, and has a very low exfoliation yield.

Another method wherein graphite is exfoliated by a chemical method such as oxidation, or acid, base, metal, and the like are inserted between the graphite carbon layers to obtain graphene or an oxide thereof that is exfoliated from an intercalation compound, is known.

However, the former method may generate a number of defects on finally prepared graphene, in the course of obtaining graphene by proceeding with exfoliating by oxidation of graphite, and reducing a graphene oxide obtained therefrom again to obtain graphene. This may adversely affect the properties of finally prepared graphene. Further, the latter method also requires further processes such as using and treating the intercalation compound, and thus, the overall process is complicated, the yield is insufficient, and the economics of the process may be poor. Moreover, it is not easy to obtain a graphene sheet or flake having a large area in such a method.

Due to the problems of those methods, recently, a method of preparing graphene by exfoliating carbon layers contained in graphite by a milling method using ultrasonic irradiation, a ball mill or the like, in a state of dispersing graphite and the like in liquid, is applied the most. However, these methods also had problems of being difficult to obtain graphene having sufficiently small thickness and a large area, generating a number of defects on graphene in an exfoliating process, or having an insufficient exfoliation yield, or the like.

This causes continuous demand for a preparation method capable of easily preparing a graphene sheet or flake having a smaller thickness and a large area in a higher yield

DETAILED DESCRIPTION OF THE INVENTION

Technical Problem

It is an object of the present invention to provide a method for preparing graphene that can produce graphene in an excellent efficiency by using a high-pressure homogenization and a block copolymer.

Technical Solution

In order to achieve these objects, the present invention provides a block copolymer comprising a repeating unit represented by the following Chemical Formula 1 and a repeating unit represented by the following Chemical Formula 2:

[Chemical Formula 1]

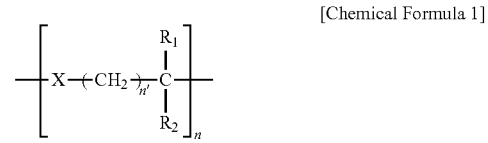

in Chemical Formula 1,

X is a bond or oxygen, $R_1$ and $R_2$ are each independently hydrogen; $C_{1-4}$ alkyl; carboxy group; or $C_{6-20}$ aryl substituted with a carboxy group or a sulfonic acid group, provided that when X is a bond, $R_2$ is not hydrogen and $C_{1-4}$ alkyl, n is an integer of 1 to 10,000, and n' is an integer of 0 to 2,

[Chemical Formula 2]

in Chemical Formula 2, $R_3$ and $R_4$ are each independently hydrogen; $C_{6-20}$ aryl; —COO—($C_{6-20}$ aryl); or —COO—($C_{1-4}$ alkylene)-($C_{6-20}$ aryl), and m is an integer of 1 to 10,000.

The present invention also provides a method for preparing graphene, comprising the step of passing a feed solution including graphite through a high-pressure homogenizer including an inlet, an outlet, and a micro-channel that connects between the inlet and the outlet and has a diameter in a micrometer scale, wherein the feed solution includes the above-described block copolymer.

The term 'graphite' as used herein is a material also called black lead or plumbago, and is a mineral belonging to a hexagonal system having a crystal structure such as quartz, and has black color and metallic luster. Graphite has a layered, planar structure, and a single layer of graphite is called 'graphene' that tries to produce in the present invention, and thus graphite is a main raw material for the production of graphene.

In order to exfoliate graphene from graphite, it is necessary to apply energy that can overcome the π-π interaction between stacked graphenes. In the present invention, high-pressure homogenization method is used as described later. The high-pressure homogenization method can apply a strong shear force to graphite, and thus the exfoliation efficiency of graphene is excellent, but agglomeration occurs between the graphene produced. Therefore, it is required to use a dispersant capable of dispersing the exfoliated graphene.

The dispersant serves to mediate graphite or graphene that is hydrophobic and a solvent of a feed solution that is hydrophilic, and thereby maintain these in a dispersed state, and it is also called a surfactant or an exfoliation auxiliary agent in other terms. In particular, the present invention is characterized by using a block copolymer having a novel structure for effective exfoliation of graphene, and contains features that the exfoliating efficiency is greatly increased as compared with the existing dispersant.

Hereinafter, the present invention will be described in detail.

Block Copolymer-1

Preferably, the block copolymer is represented by the following Chemical Formula 3:

[Chemical Formula 3]

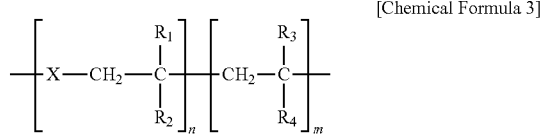

in Chemical Formula 3,

X is a bond or oxygen, $R_1$ and $R_2$ are each independently hydrogen; $C_{1-4}$ alkyl; carboxy group; or $C_{6-20}$ aryl substituted with a carboxy group or a sulfonic acid group, provided that when X is a bond, $R_2$ is not hydrogen and $C_{1-4}$ alkyl, $R_3$ and $R_4$ are each independently hydrogen; $C_{6-20}$ aryl; —COO—($C_{6-20}$ aryl); or —COO—($C_{1-4}$ alkylene)-($C_{6-20}$ aryl), n is an integer of 1 to 10,000, and m is an integer of 1 to 10,000.

The block copolymer represented by Chemical Formula 3 includes a hydrophilic block and a hydrophobic block.

The hydrophilic block is a repeating unit on the left side of Chemical Formula 3, and a block having hydrophilicity is formed by the structure of X, $R_1$ and/or $R_2$. That is, X is oxygen and/or the carboxyl group or sulfonic acid group that the substituents of $R_1$ and $R_2$ have is hydrophilic.

Preferably, X is a bond, $R_1$ is hydrogen; or $C_{1-4}$ alkyl, and $R_2$ is a carboxy group; or $C_{6-20}$ aryl substituted with a carboxyl group or a sulfonic acid group.

Further, preferably, X is oxygen and $R_1$ and $R_2$ are hydrogen.

Further, preferably, $R_1$ and $R_2$ are each independently hydrogen; methyl; carboxy group; or phenyl substituted with a sulfonic acid group.

The hydrophobic block is a repeating unit on the right side of Chemical Formula 3, and a block having hydrophobicity is formed by the structure of $R_3$ and $R_4$. That is, $R_3$ and $R_4$ are hydrogen; $C_{6-20}$ aryl; —COO—($C_{6-20}$ aryl); or —COO—($C_{1-4}$ alkylene)-($C_{6-20}$ aryl); which are hydrophobic, and thus they are totally hydrophobic.

Preferably, $R_3$ and $R_4$ are each independently hydrogen; phenyl; naphthyl; pyrene-2-ylmethoxycarbonyl; or 4-(pyrene-2-yl)butoxycarbonyl.

Further, preferably, n is an integer of 30 to 1000, and m is an integer of 10 to 100.

As described above, since the block copolymer that is used in the present invention has hydrophilicity and hydrophobicity simultaneously, it can mediate graphene that is hydrophobic and a solvent of a feed solution that is hydrophilic and thereby increase the exfoliation efficiency of graphene and increase the dispersion stability thereof.

In Chemical Formula 3, preferably, $R_1$ and $R_2$ are each independently hydrogen; methyl; carboxy group; or phenyl substituted with a sulfonic acid group, and $R_3$ and $R_4$ are each independently hydrogen; phenyl; naphthyl; or pyrenyl.

A representative example of the block copolymer represented by Chemical Formula 3 is as follows:

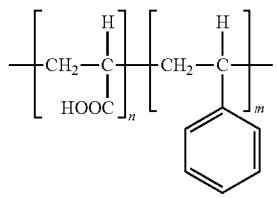

Further, the ratio (n:m) of n and m is preferably 2-10:1.

The block copolymer represented by Chemical Formula 3 can be prepared by first polymerizing a hydrophilic block and then polymerizing a hydrophobic block or vice versa.

As an example, when X is a bond, it can be produced by a method of first polymerizing the monomer of $H_2CH=CR_1R_2$ and then polymerizing $H_2CH=CR_3R_4$. Further, as an example, when X is oxygen, it can be produced by a method of first polymerizing the monomer of $CH_2CR_1R_2O$ and then polymerizing $H_2CH=CR_3R_4$.

It is preferable to use a chain transfer agent and a radical initiator together during the polymerization. Examples of the chain transfer agent may include CDB (cumyldithiobenzoate), and examples of the radical initiator may include AIBN (azobisisobutyronitrile), but are not limited thereto. Further, when $R_1$ and $R_2$ include a hydroxy group or a carboxy group, they can be protected with a protecting group (for example, tert-butyl) prior to polymerization, and then the protection group can be removed after the polymerization is completed.

The method for producing the block copolymer of Chemical Formula 3 will be described in more detail with reference to the examples below.

Block Copolymer-2

Further, preferably, the block copolymer includes a repeating unit represented by the following Chemical Formula 4 and a repeating unit represented by the following Chemical Formula 5:

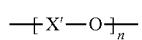

[Chemical Formula 4]

in Chemical Formula 4,

X' is $C_{1-3}$ alkylene, and n is an integer of 1 to 10,000,

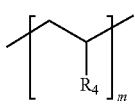

[Chemical Formula 5]

in Chemical Formula 5, $R_4$ is $C_{6-20}$ aryl, or —COO—($C_{1-4}$ alkylene)-($C_{6-20}$ aryl), and m is an integer of 1 to 10,000.

Preferably, in Chemical Formula 4, X' is ethylene (—$CH_2$—$CH_2$—).

Preferably, in Chemical Formula 5, $R_4$ is phenyl, naphthyl, or —$COOCH_2$-(pyrenyl).

More preferably, $R_4$ is phenyl, 1-naphthyl, or —$COOCH_2$-(pyrene-2-yl).

Preferably, n is an integer of 1 to 10.000, and m is an integer of 1 to 5,000. Also preferably, the ratio (n:m) of n and m is 1-20:1, more preferably 1-10:1, and the hydrophilicity and the hydrophobicity in the block copolymer can be controlled by adjusting the above ratio. More preferably, n is an integer of 30 to 1000, and m is an integer of 10 to 100.

Preferably, the block copolymer according to the present invention is represented by the following Chemical Formula 6:

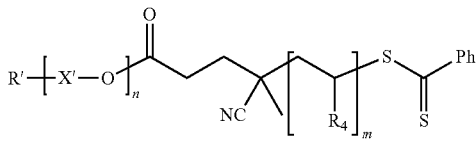

[Chemical Formula 6]

in Chemical Formula 6,

R' is $C_{1-3}$ alkoxy,

X', $R_4$, n and m are as defined above.

In addition, the present invention provides, for example, a process for preparing a block copolymer as shown in the following Reaction Scheme 1:

[Reaction Scheme 1]

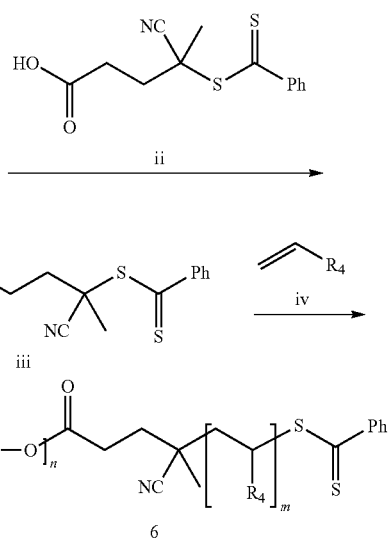

In Reaction Scheme 1, X', $R_4$, R', n and m are as defined above.

The step 1 is a step of reacting a compound represented by Chemical Formula i with a compound represented by Chemical Formula ii to prepare a compound represented by Chemical Formula iii, which is a step of reacting the hydroxy group of the compound represented by Chemical Formula i with the carboxyl group of the compound represented by Chemical Formula ii. The reaction is preferably carried out in the presence of DMAP (4-dimethylaminopyridine) and DCC (N,N'-dicyclohexylcarbodiimide). Further, as the solvent, DCM (dichloromethane) can be used.

The step 2 is a step of reacting a compound represented by Chemical Formula iii with a compound represented by Chemical Formula iv to prepare a compound represented by Chemical Formula 6, which is a block copolymer according to the present invention. The reaction is preferably carried out in the presence of AIBN. Further, as the solvent, the solvent used in the step 1 can be used as it is, and for example, DCM can be used.

In addition, if necessary, the compound represented by Chemical Formula 6 thus prepared can be purified by dissolving it in hexane or the like.

The method for preparing the block copolymer of Chemical Formula 6 will be described in more detail with reference to the examples below.

Feed Solution

The term 'feed solution' as used herein means a solution containing the graphite and the block copolymer according to the present invention, which is a solution introduced into a high-pressure homogenizer described below.

The concentration of graphite in the feed solution is preferably 0.5 to 5% by weight. When it is less than 0.5% by weight, the concentration is too low, and thereby the exfoliation efficiency of graphene is decreased. When it exceeds 5% by weight, the concentration is too high, which may cause problems such as blocking the flow channel of the high-pressure homogenizer.

In addition, the block copolymer according to the present invention in the feed solution is preferably used in an amount of 5 to 200% by weight, more preferably 5 to 100% by weight, still more preferably 5 to 40% by weight of the graphite. If it is less than 5% by weight, the concentration of the above block copolymer is too low and so the graphene exfoliation efficiency and dispersion effect are deteriorated. If it exceeds 200% by weight, the amount of the dispersant is too large, and thereby it may act as an element of inhibiting the expression of graphene characteristics.

As the solvent of the feed solution, one or more selected from the group consisting of water, NMP (N-methyl-2-pyrrolidone), acetone, DMF (N,N-dimethylformamide), DMSO (dimethyl sulfoxide), CHP (cyclohexyl-pyrrolidinone), N12P (N-dodecyl-pyrrolidone), benzyl benzoate, N8P (N-octyl-pyrrolidone), DMEU (dimethyl-imidazolidinone), cyclohexanone, DMA (dimethylacetamide), NMF (N-methyl formamide), bromobenzene, chloroform, chlorobenzene, benzonitrile, quinoline, benzyl ether, ethanol, isopropyl alcohol, methanol, butanol, 2-ethoxyethanol, 2-butoxyethanol, 2-methoxypropanol, THF (tetrahydrofuran), ethylene glycol, pyridine, N-vinylpyrrolidone, methyl ethyl ketone (butanone), alpha-terpineol, formic acid, ethyl acetate and acrylonitrile may be used, and water may be preferably used.

High-Pressure Homogenization

This is a step of subjecting the feed solution to high-pressure homogenization to exfoliate graphene from the graphite in the feed solution.

The term 'high-pressure homogenization' refers to applying a high pressure to a micro-channel having a diameter in a micrometer scale, and applying a strong shear force to the material passing through it. Generally, the high-pressure homogenization is performed using a high-pressure homogenizer including an inlet, an outlet, and a micro-channel that connects between the inlet and the outlet and has a diameter in a micrometer scale.

As described above, since the hydrophobic graphene and the solvent of the hydrophilic feed solution are mediated by the block copolymer according to the present invention in the feed solution, the effect of exfoliating graphene by the high-pressure homogenization is excellent, and the dispersion stability of the exfoliated graphene is excellent.

The micro-channel has preferably a diameter of 10 to 800 µm. Further, it is preferable that the feed solution is introduced in the inlet of the high-pressure homogenizer under application of a pressure of 100 to 3,000 bar and passed through the micro-channel.

Furthermore, the feed solution that has passed through the micro-channel can be reintroduced into the inlet of the high-pressure homogenizer, whereby graphene can be additionally exfoliated.

The reintroducing may be repeated twice to ten times. The reintroducing can be carried out by repeatedly using the high-pressure homogenizer used or by using a plurality of high-pressure homogenizers. In addition, the reintroducing may be separately performed by each process, or performed continuously.

Meanwhile, the method may further include a step of recovering and drying graphene from the dispersion of graphene recovered in the outlet. The recovering may be carried out by centrifugation, vacuum filtration or pressure filtration. Further, the drying may be carried out by vacuum drying at a temperature of about 30 to 200° C.

The graphene thus prepared can be utilized for various purposes by re-dispersing it in various solvents. The application of the graphene may include conventional graphene applications and uses such as a conductive paste composition, a conductive ink composition, a composition for forming a heat dissipation substrate, an electrically conductive composite, a composite for EMI shielding, a conductive material or slurry for a battery, and the like.

Advantageous Effects

The present invention has features that, by using the block copolymer to mediate graphene that is hydrophobic and a solvent of a feed solution that is hydrophilic, the exfoliation efficiency of graphene as well as the dispersion stability thereof can be increased during high-pressure homogenization.

BRIEF DESCRIPTION OF DRAWINGS

FIG. 1 shows the results of $^1$H-NMR (FIG. 1(a)) and GPO (FIG. 1(b)) analysis of PtBA-b-PS block copolymer prepared in Example 1 of the present invention.

FIG. 2 shows the results of $^1$H-NMR analysis of PAA-b-PS block copolymer before purification prepared in Example 1 of the present invention.

FIG. 3 shows the results of $^1$H-NMR analysis of PAA-b-PS block copolymer after purification prepared in Example 1 of the present invention.

FIG. 4 shows SEM images of the dispersions of graphene prepared in Example 1 (FIGS. 4(a) and 4(b)) and Example 2 (FIGS. 4(c) and 4(d)) of the present invention.

FIG. 5 shows a Raman spectrum of the dispersion of graphene prepared in Example 1 of the present invention.

FIG. 6 shows the sedimentation velocity of the dispersion of graphene prepared in Example 1 of the present invention.

FIG. 7 shows $^1$H-NMR results (FIG. 7a) and FT-IR results (FIG. 7b) of PEO-CTA prepared in one embodiment of the present invention.

FIG. 8 shows $^1$H-NMR results (FIG. 8a) and GPO analysis results (FIG. 7b) of PEO-b-PS prepared in one embodiment of the present invention.

FIG. 9 shows $^1$H-NMR results of PEO-b-PVN prepared in one embodiment of the present invention.

FIG. 10 shows SEM images of the dispersions of graphene prepared in Example 3 (FIGS. 10(a) and 10(b)) and Example 4 (FIGS. 10(c) and 10(d)).

FIG. 11 shows SEM images of the dispersion of graphenes prepared in Example 3 (FIGS. 11(a) and 11(b)) and Example 4 (FIGS. 11(c) and 11(d)).

FIG. 12 shows a TEM image of the dispersion of graphene prepared by using the block copolymer of the present invention as a dispersant.

FIG. 13 shows Raman spectra of the dispersion of graphene prepared by using the block copolymer of the present invention as a dispersant.

FIG. 14 shows the graphene particle size according to the number of high-pressure homogenization processes of the dispersion of graphene prepared by using the block copolymer of the present invention as a dispersant.

DETAILED DESCRIPTION OF THE EMBODIMENTS

Hereinafter, preferred embodiments are presented to aid in understanding of the invention. However, the following examples are provided only to illustrate the present invention, and the scope of the present invention is not limited thereto.

Example 1

Step 1) Preparation of block copolymer 10 g of tert-butyl acrylate (tBA), 454 mg of CDB (cumyldithiobenzoate) and 27.3 mg of AIBN (azobisisobutyronitrile) were mixed to prepare a reaction solution, oxygen was removed by freeze and thaw, and then the reaction was carried out at 70° C. for 24 hours. The reaction solution was cooled and then put into an excess amount of water/ethanol (1:3) solution to obtain 9.0 g of a red polymer (PtBA) powder.

2.0 g of the polymer (PtBA) thus prepared, 4.0 g of styrene and 3.6 mg of AIBN were mixed to prepare a reaction solution, oxygen was removed, and the reaction was carried out at 85° C. for 48 hours. The reaction solution was cooled and then put into an excess amount of water/ethanol (1:3) solution to obtain 9.0 g of a red polymer powder. The reaction solution cooled and then put into an excess amount of water/ethanol (1:5) solution to obtain 3.0 g of red polymer (PtBA-b-PS) powder.

In order to hydrolyze the tert-butyl acrylate block, 2.0 g of the prepared red polymer (PtBA-b-PS) was dissolved in 2.0 g of methylene chloride and then 10 equivalents of TFA (trifluoroacetic acid) per tBA monomer was added dropwise under reflux, and the mixture was reacted for 48 hours. After the reaction, the reaction solution was precipitated in excess hexane to recover a polymer. The recovered polymer was purified by Soxhlet with cyclohexane, and finally 0.8 g of a polymer (PAA-b-PS, FAA:PS (weight ratio)=2:1, molecular weight: 4.4 K) was produced.

Step 2) Preparation of graphene 2.5 g of graphite and 1 g of the block copolymer prepared in Example 1 or the block copolymer prepared in Example 2 were mixed with 500 mL of water to prepare a dispersion solution. The feed solution was fed in the inlet of the high-pressure homogenizer. The high-pressure homogenizer has a structure including an inlet of the raw material, an outlet of the exfoliated product, and a micro-channel that connects between the inlet and the outlet and has a diameter in a micrometer scale.

The feed solution was introduced in the inlet while applying high-pressure of 1,600 bar, and a high shear force was applied while passing through a micro-channel having a diameter of 75 μm. The feed solution recovered from the inlet was reintroduced into the inlet of the high-pressure homogenizer and the high-pressure homogenization process was repeated. The repetition was made until the number of the high-pressure homogenization processes became 10 times in total, to prepare a dispersion of graphene.

Example 2

A polymer (PAA-b-PS, PAA:PS (weight ratio)=4:1) was prepared in the same manner as in Example 1, except that 4.0 g of PtBA and 4.0 g of styrene were used. A dispersion of graphene was prepared by using the above polymer.

Experimental Example 1

The PtBA-b-PS and PAA-b-PS prepared in Example 1 were subjected to $^1$H-NMR and GPC analysis, respectively, and the results were shown in FIGS. 1 to 3.

FIG. 1 shows the results of $^1$H-NMR and GPC analysis of PtBA-b-PS prepared in Example 1 above. As shown in FIG. 1 (a), the peak at 1.38 ppm is due to the butyl group of PtBA, and the peaks at 6.60 ppm and 7.05 ppm were due to the phenyl group of PS. It was confirmed through the ratio of these peaks that the ratio (n:m) of the number (n) of repeating units of PtBA to the number (m) of repeating units of PS was about 2.8:1. Further, as shown in FIG. 1(b), it was confirmed that a block copolymer having a narrow molecular weight distribution was synthesized.

Further. FIG. 2 shows the results of $^1$H-NMR analysis of PAA-b-PS prepared in Example 1 before being purified by Soxhlet with cyclohexane, and FIG. 3 shows the results of $^1$H-NMR analysis of PAA-b-PS prepared in Example 1 after being purified by Soxhlet with cyclohexane.

As shown in FIG. 2, peaks at 6.60 ppm and 7.05 ppm due to the phenyl group of PS were maintained, while peaks at 1.38 ppm due to the butyl group of PtBA disappeared. Consequently, it was confirmed that PtBA was selectively converted to FAA. Further, as shown in FIG. 3, it was confirmed that peaks at 6.60 and 7.10 ppm due to the phenyl group of PS were reduced by purification, and consequently the polymer other than PAA-b-PS was removed. In addition, it was confirmed through the ratio of the peaks in FIG. 3 that the ratio (n:m) of the number (n) of repeating units of PAA and the number (m) of repeating units of PS was about 2.8:1 similarly to PtBA-b-PS.

Experimental Example 2

The dispersions of graphene prepared in Examples 1 and 2 were observed with an SEM image, and the results were shown in FIG. 4.

As shown in FIG. 4, it was confirmed that graphene flakes were well exfoliated and the surface roughness was smooth.

Experimental Example 3

The dispersion of graphene prepared using the block copolymer of Example 1 was coated thinly on a Si/SiO$_2$ wafer and Raman spectra were measured. The results were shown in FIG. 5.

As shown in FIG. 5, the $I_D/I_G$ value was 0.104, which was almost equal to the $I_D/I_G$ value (0.107) of the graphite before high-pressure homogenization, and thus it was confirmed that there were less graphene defects.

Experimental Example 4

The sedimentation velocity of the dispersion of graphene prepared using the block copolymer of Example 1 was measured as described below. For comparison, a dispersion of graphene was prepared in the same manner as in Example 1, except that SDBS was used instead of the block copolymer in Step 2, and the sedimentation velocity was measured as described below.

Specifically, 1 mL of each dispersion of graphene was put into the cell, and the particles were sedimented artificially by applying a centrifugal force. The sedimentation velocity of the particles was varied according to the dispersion state, and the dispersion stability was compared relatively within the same conditions by measuring the sedimentation velocity of the particles within a certain interval, and the results were shown in FIG. 6.

As shown in FIG. 6, the sedimentation velocity of the dispersion of graphene prepared using the block copolymer of Example 1 was about 15% slower than that of the dispersion of graphene prepared using SDBS, which means that the dispersion stability was excellent.

Example 3: Preparation of PEO-b-PS Block Copolymer

Step 1) Preparation of PEO-CTA 5.4 g of polyethylene oxide (PEO) having a molecular weight of 5,000 g/mol (n~113), one end of which was substituted with methoxy, 0.60 g of 4-cyano-4-(phenylcarbonothioylthio) pentanoic acid, and 26 mg of DMAP were put into DCM to prepare a mixed solution. Argon gas was injected therein to remove oxygen, to which 330 mg of DCC was added and the reaction was carried out at 40° C. for 24 hours. The reaction solution was cooled and then put into an excess amount of ether to obtain 5.2 g of red PEO macrochain transfer agent powder, which was named 'PEO-CTA'.

The $^1$H-NMR and FT-IR results of the PEO-CTA thus prepared were shown in FIG. 7. As shown in FIG. 7 (a), peaks at 3.65 ppm due to the ethylene group of PEO and peaks at 7.57 and 7.40 ppm due to the phenyl group of CTA were observed simultaneously. From the FT-IR results of FIG. 7(b), the peak of ester appearing at 1735 cm$^{-1}$ after substitution was confirmed, whereby CTA was well bonded to the end of PEO.

Step 2) Preparation of PEO-b-PS Block Copolymer 0.5 g of PEO macrochain transfer agent prepared in the step 1, 2 g of styrene and 1.6 mg of AIBN (azobisisobutyronitrile) were mixed to prepare a reaction solution. After removing oxygen, the reaction was carried out at 85° C. for 72 hours. The reaction solution was cooled and then was put into an excess amount of hexane to finally obtain 0.9 g of a polymer (PEO:PS (weight ratio)=1:1.4, number average molecular weight: 12 k, n~113, m~72), which was named 'PEO-b-PS'.

The results of $^1$H-NMR and GPC analysis of PEO-b-PS thus prepared were shown in FIG. 8. As shown in FIG. 8(a), peaks at 3.65 ppm were due to the ethylene groups of PEO, peaks at 6.60 ppm and 7.05 ppm were due to the phenyl group of PS. It was confirmed through the ratio of these peaks that the ratio (n:m) of the number (n) of repeating units of PEO and the number (m) of repeating units of PS was about 1.6:1. Further, as shown in FIG. 8(b), it was confirmed that a block copolymer having a narrow molecular weight distribution was synthesized.

Example 4: Preparation of PEO-b-PVN Block Copolymer 0.8 g of the PEO-CTA prepared in Step 1 of Example 3, 1.6 g of 2-vinylnaphthalene and 2.1 mg of AIBN were mixed to prepare a reaction solution. After removing oxygen, the reaction was carried out at 85° C. for 72 hours. The reaction solution was cooled and then put into an excess amount of hexane to obtain 1.0 g of PEO-PVN polymer (PEO:PVN (weight ratio)=1:0.6, number average molecular weight: 8.1 k, n~113, m~20).

The PEO-b-PVN thus prepared was analyzed by $^1$H-NMR, and the results were shown in FIG. 9. As shown in FIG. 9, the peaks at 3.65 ppm were due to the ethylene groups of PEO, and the peaks at 6.30-8.00 ppm were due to the naphthalene groups of PVN. It was confirmed through the ratio of these peaks that the ratio (n:m) of the number (n) repeating units of PEO and the number (m) of repeating units of PVN was about 5.7:1.

Experimental Example 5: Preparation of Dispersion of Graphene 2.5 g of graphite (BNB90) and 1 g of the block copolymer (PEO-b-PS) prepared in Example 3 were mixed with 500 ml of water to prepare a feed solution (concentration of graphite: 5 mg/mL, concentration of the block copolymer: 2 mg/mL).

The feed solution was fed to the inlet of the high-pressure homogenizer. The high-pressure homogenizer has a structure including an inlet of the raw material, an outlet of the exfoliated product, and a micro-channel that connects between the inlet and the outlet and has a diameter in a micrometer scale. The feed solution was introduced in the inlet while applying a high pressure of 1,600 bar, and a high shear force was applied while passing through a micro-channel having a diameter of 75 μm. A part of the feed solution recovered in the inlet was taken as a sample, and the remainder was reintroduced into the inlet of the high-pressure homogenizer and the high-pressure homogenization process was repeated. The repetition was made until the number of high-pressure homogenization processes became 10 times in total, to prepare a dispersion of graphene.

Experimental Example 6: Preparation of Dispersion of Graphene

The feed solution (concentration of graphite: 5 mg/mL, concentration of the block copolymer: 2 mg/mL) was prepared in the same manner as in Experimental Example 5, except that 1 g of the block copolymer prepared in Example 4 was used instead of the block copolymer prepared in Example 3, thereby obtaining a dispersion of graphene.

Experimental Example 7: Preparation of Dispersion of Graphene

A dispersion of graphene was prepared in the same manner as in Experimental Example 5 except that 500 mL of NMP was used instead of 500 mL of water during preparation of a feed solution.

Experimental Example 8: Preparation of Dispersion of Graphene

A dispersion of graphene was prepared in the same manner as in Experimental Example 6 except that 500 mL of NMP was used instead of 500 mL of water during preparation of a feed solution.

Experimental Example 9: Analysis of Graphene

1) Observation of graphene shape according to dispersant

The dispersion of graphene prepared in Experimental Examples 5 to 8 was dropped on a silicon wafer and dried. The resulting sample was observed with an SEM image, and the results were shown in FIG. 10 and FIG. 11. FIGS. 10(a) and (b) show SEM images of the dispersion of graphene of Experimental Example 5, FIGS. 10(c) and (d) show those of Experimental Example 6, FIGS. 11(a) and (b) show those of Experimental Example 7, and FIGS. 11(c) and (d) show those of Experimental Example 8.

As shown in FIGS. 10 and 11, it was confirmed that the surface roughness was low because graphene having a relatively small thickness was formed. If the thickness was thick, the graphenes overlapped at random. Therefore, in case where the surface roughness was large but the thickness was thin, the roughness was very small as if one sheet of paper adhered to the surface.

In addition, the graphene in the dispersion of graphene prepared in Experimental Example 5 was observed with a TEM image, and the result was shown in FIG. 12. As shown in FIG. 12, it was confirmed that a thin graphene was produced similarly to FIGS. 10 and 11.

2) Raman Spectrum Analysis

The dispersion of graphene prepared in Experimental Example 5 was analyzed by Raman spectroscopy, and the results were shown in FIG. 13.

The ratio of $I_D/I_G$ by Raman spectrum is the result of measurement of the disordered carbon, which means sp3/sp2 carbon ratio. Therefore, the larger the $I_D/I_G$ value, the higher the degree that sp2 carbon of pure graphene changed to sp3 carbon. This means that the characteristic inherent to pure graphene was deteriorated.

In the oxidized graphite produced by the conventionally known Hummers process, the ratio of $I_D/I_G$ by Raman spectrum was closer to about 1.0 and thus many defects occurred. As shown in FIG. 12, however, it was confirmed that the $I_D/I_G$ value of the dispersion of graphene produced in Experiment Example 5 was 0.108, which was almost similar to the value of pure graphite (BNB 90), and the occurrence of defects was remarkably low.

3) Analysis of Graphene Particle Size

The graphene particle size (lateral size) was analyzed according to the number of times of high-pressure homogenization processes of the dispersion of graphene prepared in Experimental Example 5. The results were shown in FIG. 14 and Table 1 below.

TABLE 1

| | Distribution base | Number of high-pressure homogenization processes | Average graphene particle size |
|---|---|---|---|
| FIG. 14(a) | Area | 1 times | 12.88 ± 8.52 μm |
| FIG. 14(b) | Area | 5 times | 5.27 ± 0.88 μm |
| FIG. 14(c) | Area | 10 times | 3.61 ± 0.49 μm |
| FIG. 14(d) | Volume | 1 times | 19.91 ± 17.48 μm |
| FIG. 14(e) | Volume | 5 times | 5.56 ± 4.46 μm |
| FIG. 14(f) | Volume | 10 times | 3.68 ± 0.49 μm |

As shown in FIG. 14 and Table 1, it was confirmed that as the number of high-pressure homogenization processes was increased, the size of graphene became smaller and the deviation became smaller, and thus uniform graphene was produced.

The invention claimed is:

1. A method for preparing graphene, comprising the step of passing a feed solution including graphite through a high-pressure homogenizer including an inlet, an outlet, and a micro-channel that connects between the inlet and the outlet and has a diameter in a micrometer scale,
wherein the feed solution includes a block copolymer comprising a repeating unit represented by the following Chemical Formula 1 and a repeating unit represented by the following Chemical Formula 2:

[Chemical Formula 1]

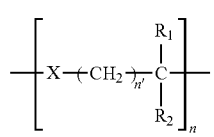

in Chemical Formula 1,
X is a bond or oxygen,
$R_1$ and $R_2$ are each independently hydrogen; $C_{1-4}$ alkyl; carboxy group; or $C_{6-20}$ aryl substituted with a carboxy group or a sulfonic acid group, provided that when X is a bond, $R_2$ is not hydrogen and $C_{1-4}$ alkyl,
n is an integer of 1 to 10,000, and
n' is an integer of 0 to 2,

[Chemical Formula 2]

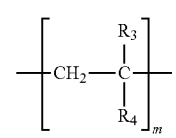

in Chemical Formula 2,
$R_3$ and $R_4$ are each independently hydrogen; $C_{6-20}$ aryl; —COO—($C_{6-20}$ aryl); or —COO—($C_{1-4}$ alkylene)-($C_{6-20}$ aryl), and
m is an integer of 1 to 10,000.

2. The method for preparing graphene according to claim 1, wherein
the block copolymer is represented by the following Chemical Formula 3:

[Chemical Formula 3]

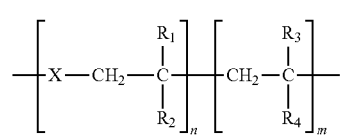

in Chemical Formula 3,
X is a bond or oxygen,
$R_1$ and $R_2$ are each independently hydrogen; $C_{1-4}$ alkyl; carboxy group; or $C_{6-20}$ aryl substituted with a carboxy group or a sulfonic acid group, provided that when X is a bond, $R_2$ is not hydrogen and $C_{1-4}$ alkyl,
$R_3$ and $R_4$ are each independently hydrogen; $C_{6-20}$ aryl; —COO—($C_{6-20}$ aryl); or —COO—($C_{1-4}$ alkylene)-($C_{6-20}$ aryl),
n is an integer of 1 to 10,000, and
m is an integer of 1 to 10,000.

3. The method for preparing graphene according to claim 2, wherein
X is a bond,
$R_1$ is hydrogen; or $C_{1-4}$ alkyl, and
$R_2$ is a carboxy group; or $C_{6-20}$ aryl substituted with a carboxyl group or a sulfonic acid group.

4. The method for preparing graphene according to claim 2, wherein
X is oxygen and
$R_1$ and $R_2$ are each independently hydrogen.

5. The method for preparing graphene according to claim 2, wherein
$R_1$ and $R_2$ are each independently hydrogen; methyl; carboxy group; or phenyl substituted with a sulfonic acid group, and
$R_3$ and $R_4$ are each independently hydrogen; phenyl; naphthyl; pyrene-2-ylmethoxycarbonyl; or 4-(pyrene-2-yl)butoxycarbonyl.

6. The method for preparing graphene according to claim 1, wherein
the block copolymer is represented by the following chemical formula:

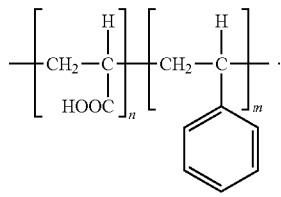

7. The method for preparing graphene according to claim 1, wherein
the ratio of n:m is 2-10:1.

8. The method for preparing graphene according to claim 1, wherein
the block copolymer includes a repeating unit represented by the following Chemical Formula 4 and a repeating unit represented by the following Chemical Formula 5:

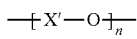

[Chemical Formula 4]

in Chemical Formula 4,
X' is $C_{1-3}$ alkylene, and
n is an integer of 1 to 10,000,

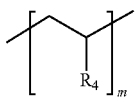

[Chemical Formula 5]

in Chemical Formula 5,
$R_4$ is $C_{6-20}$ aryl, or —COO—$(C_{1-4}$ alkylene)-$(C_{6-20}$ aryl), and
m is an integer of 1 to 10,000.

9. The method for preparing graphene according to claim 8, wherein
X' is ethylene (—$CH_2$—$CH_2$—).

10. The method for preparing graphene according to claim 8, wherein
$R_4$ is phenyl, naphthyl, or —$COOCH_2$-(pyrenyl).

11. The method for preparing graphene according to claim 8, wherein
the block copolymer is represented by the following Chemical Formula 6:

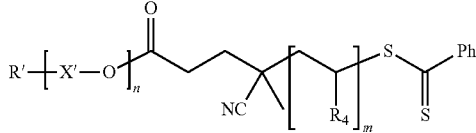

[Chemical Formula 6]

in Chemical Formula 6,
R' is $C_{1-3}$ alkoxy,
X', $R_4$, n and m are as defined in claim 8.

12. The method for preparing graphene according to claim 1, wherein
the graphite in the feed solution is exfoliated while passing through the micro-channel under application of a shear force, thereby preparing the graphene.

13. The method for preparing graphene according to claim 1, wherein
the micro-channel has a diameter of 10 to 800 μm.

14. The method for preparing graphene according to claim 1, wherein
the feed solution is introduced in the inlet of the high-pressure homogenizer under application of a pressure of 100 to 3,000 bar and passed through the micro-channel.

15. The method for preparing graphene according to claim 1, wherein
a solvent of the feed solution is one or more selected from the group consisting of water, NMP (N-methyl-2-pyrrolidone), acetone, DMF (N,N-dimethylformamide), DMSO (dimethyl sulfoxide), CHP (cyclohexyl-pyrrolidinone), N12P (N-dodecyl-pyrrolidone), benzyl benzoate, N8P (N-octyl-pyrrolidone), DMEU (dimethyl-imidazolidinone), cyclohexanone, DMA (dimethylacetamide), NMF (N-methyl formamide), bromobenzene, chloroform, chlorobenzene, benzonitrile, quinoline, benzyl ether, ethanol, isopropyl alcohol, methanol, butanol, 2-ethoxyethanol, 2-butoxyethanol, 2-methoxypropanol, THF (tetrahydrofuran), ethylene glycol, pyridine, N-vinylpyrrolidone, methyl ethyl ketone (butanone), alpha-terpineol, formic acid, ethyl acetate and acrylonitrile.

16. The method for preparing graphene according to claim 1, wherein
the step of passing the material recovered in the inlet through the micro-channel is additionally repeated once to 9 times.

* * * * *